United States Patent [19]

Rice

[11] Patent Number: 5,677,941
[45] Date of Patent: Oct. 14, 1997

[54] CHANNEL TEST UNIT

[75] Inventor: David Reagan Rice, Morristown, N.J.

[73] Assignee: Lucent Technologies Inc., Murray Hill, N.J.

[21] Appl. No.: 397,609

[22] Filed: Mar. 2, 1995

[51] Int. Cl.[6] .............. H04M 1/24; H04M 3/08; H04J 1/16; H04J 3/10

[52] U.S. Cl. .................. 379/2; 379/5; 379/29; 379/33

[58] Field of Search .................. 379/2, 5, 6, 27, 379/29, 23; 370/13, 14, 15, 55, 56, 242, 248, 249, 251

[56] References Cited

U.S. PATENT DOCUMENTS

| | | | |
|---|---|---|---|
| 4,403,320 | 9/1983 | Canniff | 370/56 |
| 5,018,184 | 5/1991 | Abrams et al. | 379/29 |
| 5,054,050 | 10/1991 | Burke et al. | 379/27 |
| 5,361,293 | 11/1994 | Czerwiec | 379/29 |

*Primary Examiner*—Curtis Kuntz
*Assistant Examiner*—Paul Loomis
*Attorney, Agent, or Firm*—Lester H. Birnbaum

[57] ABSTRACT

Disclosed is a circuit included in a channel unit for testing that channel unit in a telecommunications system. A digital signal processor detects and reproduces signals from a local digital switch and controls a number of relays which result in various terminations appearing on the channel unit. The processor then monitors the signal levels as well as the signaling bits from the channel unit to test for proper performance.

4 Claims, 2 Drawing Sheets

CHANNEL TEST UNIT

BACKGROUND OF THE INVENTION

This invention relates to telecommunications systems including channel units.

Digital loop carrier systems, such as the Subscriber Loop Carrier (SLC®) System, typically include a remote terminal with a plurality of channel units. Each channel unit provides an interface for a number of customer lines. It is important to periodically test the performance of the channel units to ensure proper service to the customer.

In prior an systems, testing was usually controlled by a pair gain test controller located at the central office in cooperation with a channel test unit located in the remote terminal. The channel test unit included a termination circuit which presented a number of terminations to the central office. (See, e.g., U.S. Pat. No. 4,653,043 issued to Brady et al. and U.S. Pat. No. 4,270,030 issued to Brolin et al.)

More recently, it has been suggested to provide an automatic channel test unit in the remote terminal, which unit can apply appropriate terminations and detectors to the channel units without control from the central office. (See U.S. Pat. No. 5,018,184 issued to Abrams et al.) However, the test unit was still separate from the channel unit.

It may be more economical to provide a circuit on the channel unit itself which could test the unit for appropriate performance.

SUMMARY OF THE INVENTION

The invention is a channel unit including a circuit for testing the unit in a telecommunications system. The circuit includes a digital signal processor and a plurality of relay contacts controlled by the processor. A first and second relay contacts are coupled to conductors adapted for coupling to a customer's equipment so as to break the connection to the customer's equipment when the contacts are opened. A resistance equivalent to an off-hook termination is coupled to a third one of said relay contacts so as to present an off-hook termination when the third contact is operated.

BRIEF DESCRIPTION OF THE DRAWING

These and other features of the invention are delineated in detail in the description to follow. In the drawing.

DETAILED DESCRIPTION

Figure 1:
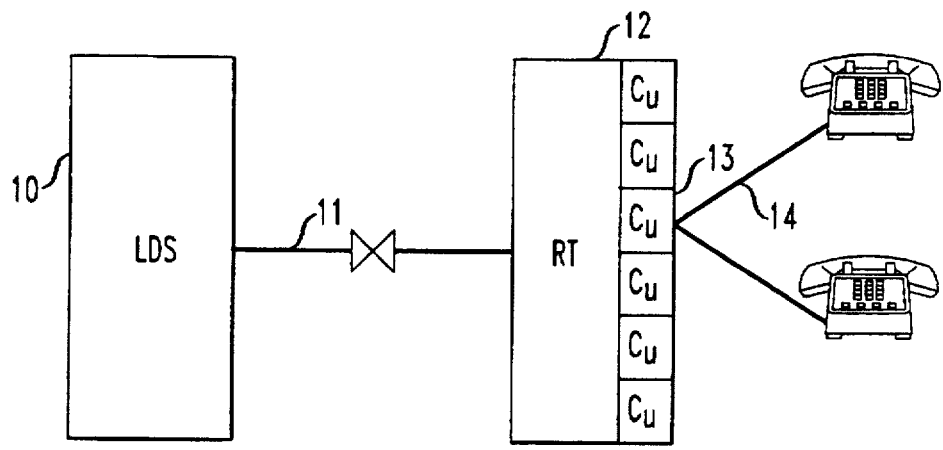
FIG. 1 is a block diagram of a system which may utilize the present invention.

As illustrated in FIG. 1, a standard digital loop carrier system includes a bidirectional link, 11, which may be optical and/or electrical, between a local digital switch (LDS), 10, at a central office and a remote terminal (RT), 12, in the vicinity of the customer's premises. The remote terminal, 12, includes a plurality of channel units (CU), e.g., 13, which interface with a number of customer lines. In this example, two lines, e.g., 14, are shown, each including a tip and ring wire pair. The channel units perform several functions such as analog/digital conversion, detecting off-hook conditions, and providing gain, equalization, and balance.

Figure 2:
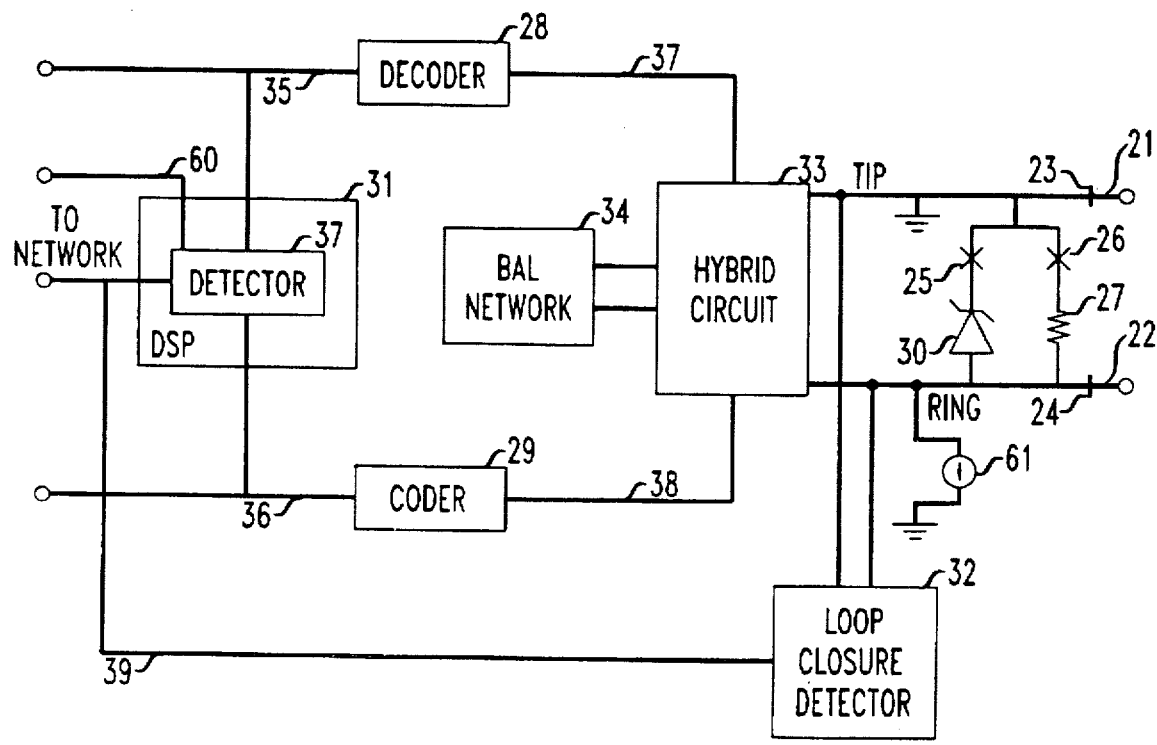
FIG. 2 is a schematic diagram of a channel unit including a circuit in accordance with an embodiment of the invention.

FIG. 2 illustrates a portion of a typical channel unit, 13, including a circuit for self-testing of at least some of the functions of the unit. The unit includes a pair of conductors, 21 and 22, which are adapted for electrically coupling to a customer's tip and ring wire pair when the unit is positioned within an appropriate shelf (not shown) in the remote terminal, 12. Coupled to each conductor, 21 and 22, are normally closed relay contacts, 23 and 24, respectively. Coupled between the conductors, 21 and 22, on the network side of the contacts, 23 and 24, is a parallel connection of normally open relay contacts, 25 and 26. Coupled in series with one of the relay contacts, 26, is a resistor or resistive network, 27, which is typically either 600 or 900 ohms, but which could have a resistive component in the range 550 to 1100 ohms. Coupled in series with the other relay contact is a zener diode, 30. Also coupled to one of the conductors (22) is some means, such as a constant current source, 61, for providing line feed current.

The conductors, 21 and 22, are coupled to a standard hybrid circuit, 33, to provide conversion between the two-wire format to the customer and the four-wire format to the network. A standard balance network, 34, is coupled to the hybrid circuit, 33. The balance network of channel units toward which this invention is targeted typically has an impedance of 600 or 900 ohms to match the impedance of the customer's equipment. The hybrid circuit, 33, is coupled to a decoder, 28, at its receive port by means of conductor 37 and to a coder, 29, at its transmit port by means of conductor 38.

The decoder, 28, and coder, 29, are coupled to the network through conductors 35 and 36, respectively. The decoder and coder are also coupled to a digital signal processor (DSP), 31, and in particular to detector 37, which is part of, or connected to, the DSP and is capable of detecting 1) the amplitude of any voice signals, and 2) any signaling bits on any dedicated signal path (39, 60) in the channel unit which are transmitted between the channel unit and another component in the remote terminal.

A standard loop closure detector, 32, is also coupled to the conductors, 21 and 22, between the hybrid, 33, and relay contacts 23, 24.

Figure 3:
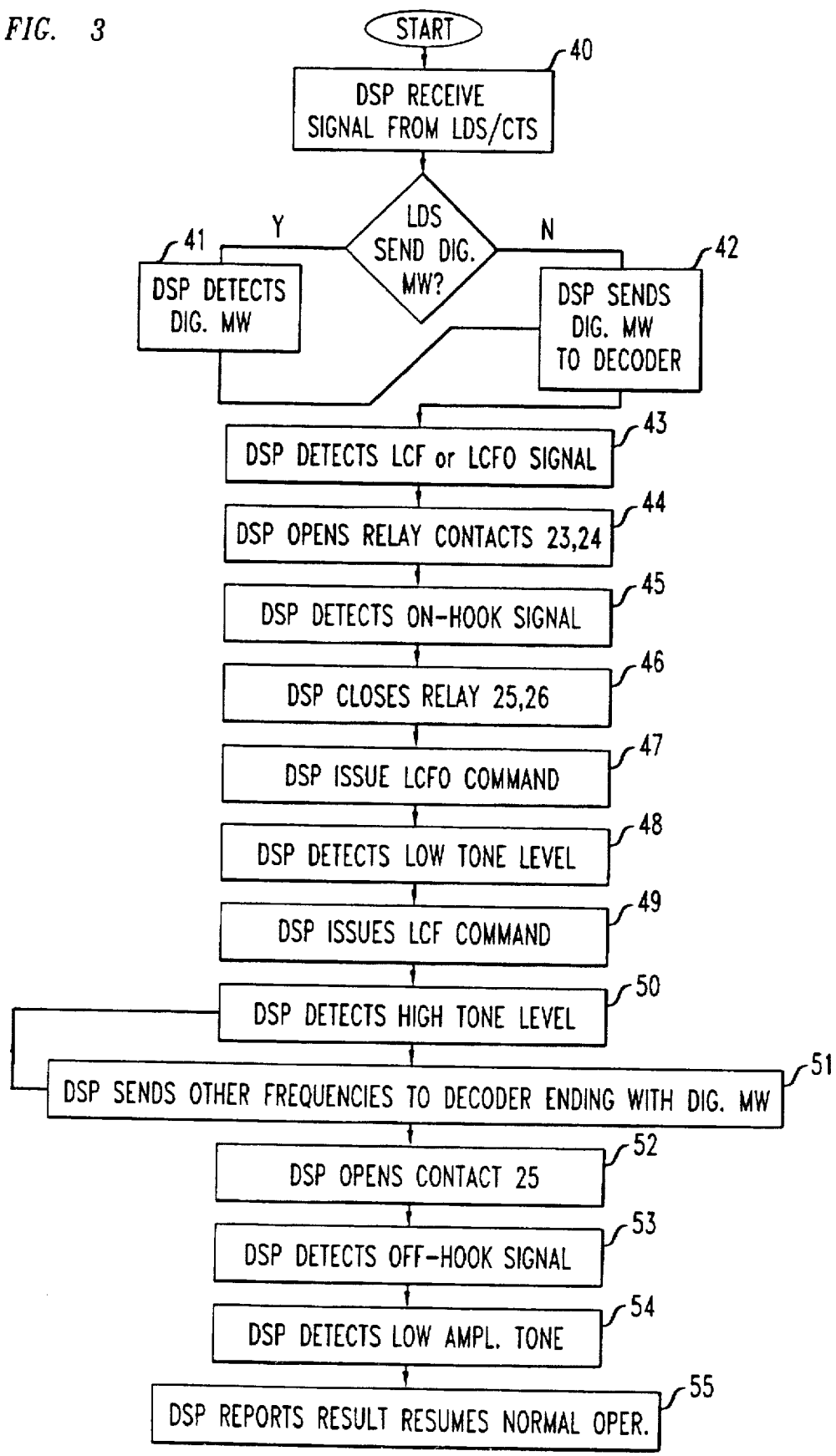
FIG. 3 is a flow diagram illustrating testing of a channel unit in accordance with an embodiment of the invention.

FIG. 3 illustrates a typical sequence for testing the channel unit with the circuit of FIG. 2. The DSP is first commanded, step 40, to perform a test sequence by means of a message from the standard channel test system (CTS) (not shown) at the LDS. In cases where the channel test system at the LDS, 10, originates a tone at a frequency such as 1 kHz and at a convenient test level such as 0 dBm, it may originate at the LDS a short duration tone (dig MW) at this time, and the DSP detects, step 41, the expected appearance of this tone via detector 37. When the DSP detects the end of the tone burst, the DSP begins to generate the same tone, step 42, toward the decoder. In this manner, the circuit can test for digital voiceband conductivity from the LDS. The DSP also detects, step 43, whether the LDS is sending the signaling code for loop current feed (LCF) (cent applied to tip and ring leads) or loop current feed open (LCFO) (disconnect current) by monitoring the ABCD signaling code. (If this ABCD code is not part of the digital stream going to the decoder, the DSP monitors that code in whatever signal path (60) is used in the channel unit to receive signaling bits from another component.) The DSP's memory will be populated with the expected signal condition for that LDS/CTS.

The DSP thereupon automatically goes through the succeeding steps. First (step 44), the DSP opens the relay contacts, 23 and 24, to create an open circuit and cut off the customer from the channel unit. This results in, or assures continuation of, an on-hook condition which is detected by the loop closure detector, 32. A standard on-hook signal is then issued by the loop closure detector, which condition is verified (step 45) by the DSP, 31, by virtue of the DSP's detector being coupled to the path of such on-hook signal at the point where the path exits the channel unit (path 39). (The ABCD signal representing the on-hook condition is typically 0000.) The detection by the DSP verifies proper response of the channel unit to the on-hook condition.

In the next step (step 46), the DSP clogs relay contacts 25 and 26 and issues LCFO command (step 47). Contact 25 couples the reverse-biased zener diode, 30, across the tip/ring pair, while contact 26 places an off-hook type of resistance, resistor 27, across the tip/ring pair in parallel with the diode. These two components are now terminating the channel unit, since contacts 23 and 24 were previously opened to disconnect the customer's equipment. The zener diode 30 is effectively a short circuit to signals from the hybrid circuit 33 if the current applied by the channel unit by source 61 is sufficient in magnitude to overcome the threshold voltage of the diode. To illustrate, suppose the threshold of the diode 30 is 12 volts, and the resistor 27 has a value of 600 ohms. If the line feed current from source 61 is low (e.g., less than 10 mA), the zener diode is not turned on and virtually all the test current flows through relay contact 26 and resistor 27. For higher line feed currents, such that the current through the resistor becomes great enough that the voltage across the resistor reaches 12 volts, the zener begins to turn on and some current also flows through the zener. For even higher battery feed cents (e.g., 35 mA) much of the current flows through the zener diode leg of this parallel circuit, causing an effective short circuit for any ac signals appearing across the customer cable pair. For example, for typical channel unit line feed circuits that deliver a constant current of 30 mA, about 20 mA would flow through the 600 ohm resistor, consistent with the conduction voltage threshold of the 12-volt zener diode, and the remaining cent, about 10 mA, would pass through the zener diode. This amount of dc current would cause the ac impedance of the diode to reduce to less than about 20 ohms for small ac signals at a level such as −10 dBm. Since the ac short circuit at the customer end of hybrid circuit 33 is a gross mismatch with the impedance of the balance network, 34, a high amplitude signal (typically about the same as the signal received by the decoder from the digital stream) will be produced on conductor 38 coupled to the coder, 29. After the coder digitizes the signal from the hybrid circuit, the DSP would detect this coder output, provided there were sufficient signal to detect. At this time, however, the channel unit has disconnected its current from source 61 to tip and ting leads in response to the LCFO command from the DSP (step 47). The lack of battery feed will cause the zener diode 30 to behave like a high ac impedance, which in turn causes the hybrid circuit to be well balanced by resistor 27. Thus, while the LCFO condition is applied, the DSP will detect at most a low tone level, step 48, which result will confirm the LCFO response of the channel unit. Then, the DSP applies the LCF signal command (step 49) which causes a high amplitude tone to reach the coder 29 and the DSP detector 37 (step 50) due to the gross mismatch with the balance network, 34, referred to above. This high tone level is verification of the channel unit's response to the LCF signal, and the precise amplitude is a measure of the channel unit's transmission quality at that frequency.

Thus, the tests of steps 46–50 determine that: 1) there is proper conduction of a signal from the LDS appearing on conductor 35, passing through the decoder, 28, the hybrid circuit, 33, and the coder 29; 2) a minimum battery feed is provided; and 3) the channel unit is responding to LCF or LCFO signal from the LDS, and to LCF and LCFO signal commands from the DSP.

At this time the DSP begins generating a sequence of tones, step 51, at various frequencies, toward the decoder, and the DSP detects the proper amplitude of each tone, in turn, in the coder output, step 50. The DSP then resumes sending a 1 kHz digital milliwatt tone (dig MW). The results validate the transmission properties of the channel unit over its intended range of frequencies.

In the next step, 52, the DSP opens relay contact 25 so that the zener diode 30 is removed from the terminating circuit and resistor 27 alone becomes the termination. Since resistor 27 has the resistance of an off-hook termination (e.g., 600 ohms), if the channel unit is operating properly, loop closure detector 32, which detects off-hook conditions, will generate its normal off-hook signal. This off-hook signal is detected by the DSP, 31, (step 53), in the same manner as described above for on-hook detection, except that the ABCD code for the off-hook condition is usually 1010. The DSP thus verifies whether the channel unit is properly responding to an off-hook condition. Also, since the resistor, 27, is chosen to match the ac resistance of the balance network, 34, a low amplitude signal now appears at conductor 38. Detection of a sufficiently low amplitude signal by the DSP, 31, (step 54) indicates that the hybrid circuit, 33, is properly balanced at this frequency of 1 kHz.

The final step, 55, is for the DSP to discontinue the test procedure, to report the test result in some fashion to the channel test system, and to resume normal operations.

It will be appreciated, therefore, that the present invention performs the major tests needed for a channel unit (except for verifying ringing) without the need for elements external to the unit. It will also be appreciated that the tests described need not be in the order specified.

Various modifications of the embodiment described are possible. For example, it may be desirable to include a capacitor (not shown) in series with the resistor, 27, which capacitor blocks the dc signal when relay 26 is closed (step 46) but produces a better hybrid balance if the balance network, 34, includes a similar capacitor. An additional parallel resistive path controlled by relay contact 25 would then be desirable to effect the desired operation of the zener diode leg in verifying battery feed and off-hook signaling response.

Another variation in procedure would be to program the LDS to send some of the test tones and signals, at the proper times.

A further variation would be to program the DSP to send other frequency tones, following step 54, to verify proper balance at those frequencies.

The procedure can also be simplified, for example, by eliminating the LCFO command and detection steps 47 and 48, respectively.

What is claimed is:

1. A channel unit including a circuit for testing the unit in a telecommunications system, the circuit comprising:

a digital signal processor;

a plurality of relay contacts controlled by the processor, a first and second one of said relay contacts being coupled to conductors adapted for coupling to a customer's equipment so as to break the connection to the customer's equipment when the contact is opened;

a resistance equivalent to an off-hook termination coupled to a third one of said relay contacts so as to simulate an off-hook termination when the third contact is operated; and a fourth one of said relay contacts in series with a zener diode coupled in parallel with the resistance and third relay contact so as to produce a short circuit termination when the third and fourth relay contacts are operated and a sufficient voltage is present across the resistance.

2. The unit according to claim 1 wherein the resistance is a resistor having a resistance of 550–1100 ohms.

3. The unit according to claim 1 further comprising a loop closure detector electrically coupled to the digital signal processor so that the processor can monitor the output of the detector when the third relay is operated.

4. The unit according to claim 1 further comprising a hybrid circuit electrically coupled to the processor so that the processor monitors conductivity of the hybrid when the third and fourth relays are operated.

* * * * *